(12) United States Patent
Sekela et al.

(10) Patent No.: US 6,222,192 B1
(45) Date of Patent: Apr. 24, 2001

(54) SCINTILLATION DETECTOR WITHOUT OPTICAL WINDOW

(75) Inventors: William D. Sekela, Aurora; Carlos Grodsinsky, Strongsville, both of OH (US)

(73) Assignee: Saint-Gobain Industrial Ceramics, Inc., Worcester, MA (US)

( * ) Notice: Subject to any disclaimer, the term of this patent is extended or adjusted under 35 U.S.C. 154(b) by 0 days.

(21) Appl. No.: 09/110,835

(22) Filed: Jul. 6, 1998

(51) Int. Cl.⁷ .............................. G01T 1/202; G01V 5/04
(52) U.S. Cl. .......................................................... 250/361 R
(58) Field of Search ........................................... 250/361 R

(56) References Cited

U.S. PATENT DOCUMENTS

| | | |
|---|---|---|
| 3,950,647 | 4/1976 | Piltingsrud . |
| 4,145,609 | 3/1979 | Takami et al. . |
| 4,424,447 | 1/1984 | Lelong et al. . |
| 4,833,320 | 5/1989 | Hurlbut . |
| 4,900,937 | * 2/1990 | Dayton et al. ............. 250/482.1 |
| 4,931,645 | 6/1990 | Welsh . |
| 4,937,446 | 6/1990 | McKeon et al. . |
| 4,994,673 | 2/1991 | Perna et al. . |
| 5,047,635 | 9/1991 | Leaney et al. . |
| 5,059,798 | 10/1991 | Persyk . |
| 5,061,849 | 10/1991 | Meisner et al. . |
| 5,205,167 | 4/1993 | Gartner et al. . |
| 5,652,429 | 7/1997 | Genna et al. . |
| 5,753,919 | * 5/1998 | Prain et al. ....................... 250/368 |

FOREIGN PATENT DOCUMENTS

| | | |
|---|---|---|
| 0 831 337 A1 | 3/1998 | (EP) . |
| WO 95/23983 | 9/1995 | (WO) . |
| wo 97/42523 | 11/1997 | (WO) . |

* cited by examiner

*Primary Examiner*—Constantine Hannaher
(74) *Attorney, Agent, or Firm*—Volker R. Ulbrich; Don W. Bulson

(57) ABSTRACT

A scintillation detector includes a scintillation crystal directly coupled to a photomultiplier tube (PMT). The crystal/PMT subassembly is attached to a voltage divider and the entire device is hermetically sealed in a stainless steel outer case. Conductors are passed through the hermetic package from the voltage divider via a high temperature metal to ceramic pass-through. The crystal and PMT are longitudinally loaded within the outer case by springs in order to minimize vibrations in the crystal and PMT. A thermoplastic support sleeve circumscribes the crystal and the PMT to protect the crystal and PMT from excessive longitudinal loading. Preferably, the support sleeve and the crystal have similar coefficients of thermal expansion so that the crystal and the support sleeve experience similar dimensional changes due to temperature fluctuations, allowing the support sleeve to best maintain its stress-limiting function as temperature within the detector changes. The support sleeve also protects the crystal/PMT subassembly from bending loads.

27 Claims, 3 Drawing Sheets

SCINTILLATION DETECTOR WITHOUT OPTICAL WINDOW

FIELD OF THE INVENTION

The invention herein described relates generally to a scintillation detector and to a method of manufacturing a scintillation detector. The scintillation detector and method are particularly useful for borehole logging applications, but may, however, have use in other applications.

BACKGROUND OF THE INVENTION

Scintillation detectors have been employed in the oil and gas industry for well logging. These detectors have used thallium-activated sodium iodide crystals that are effective in detecting gamma rays. The crystals are enclosed in tubes or casings to form a crystal package. The crystal package has an optical window at one end of the casing which permits radiation-induced scintillation light to pass out of the crystal package for measurement by a light sensing device such as a photomultiplier tube coupled to the crystal package. The photomultiplier tube converts the light photons emitted from the crystal into electrical pulses that are shaped and digitized by associated electronics. Pulses that exceed a threshold level are registered as counts that may be transmitted "uphole" to analyzing equipment or stored locally.

The ability to detect gamma rays makes it possible to analyze rock strata surrounding the bore holes, as by measuring the gamma rays coming from naturally occurring radioisotopes in down-hole shales which bound hydrocarbon reservoirs. Today, a common practice is to make measurements while drilling (MWD). For MWD applications, the detector must be capable of withstanding high temperatures and also must have high shock resistance. At the same time, there is a need to maintain performance specifications.

As new MWD tools are developed, the need for smaller detectors that meet or exceed larger detector performance is paramount. Current geophysical detectors that use hygroscopic crystals, such as thallium-activated sodium iodide crystals, require that the crystal be hermetically sealed in a stainless steel container. In order to maintain that seal under operating conditions, typically a soda lime glass window is hermetically sealed to the stainless steel housing by means of a glass to metal seal. The window is required to transmit the scintillated light produced in the crystal to a light sensing device such as a photomultiplier tube. This window assembly, along with the multiple optical interfaces needed, degrades the light transmitted to the photomultiplier. It follows, if the window and the associated interface can be removed, a gain in optical performance can be realized. This translates into a smaller crystal that has increased system nuclear performance of a larger crystal having an interface/window assembly. Therefore, it is desirable to have the photomultiplier tube directly coupled to the crystal and hermetically sealed in the housing.

However, there are many problems that must be addressed in the construction of such a windowless detector. These problems include the hermeticicity of the electrical pass-throughs, the off-gassing of volatile components that may degrade the hygroscopic crystal, and the survivability of the device under extreme environmental conditions.

Accordingly, it will be understood from the above that it would be desirable to have a scintillation detector without an optical window which overcomes the above problems.

SUMMARY OF THE INVENTION

The present invention provides a scintillation detector wherein a scintillation crystal is directly coupled to a photomultiplier tube (PMT). The crystal/PMT subassembly is attached to a voltage divider and the entire device is hermetically sealed in a stainless steel outer case. Conductors are passed through the hermetic package from the voltage divider via a high temperature metal to ceramic pass-through. The crystal and PMT are longitudinally loaded within the outer case by springs in order to minimize vibrations in the crystal and PMT and to accommodate thermal expansion and contraction of the crystal/PMT subassembly. A thermoplastic support sleeve circumscribes the crystal and the PMT to protect the crystal and PMT from excessive longitudinal and bending loads. The support sleeve and the crystal have similar coefficients of thermal expansion so that the crystal and the support sleeve experience similar dimensional changes due to temperature fluctuations, allowing the support sleeve to best maintain its stress-limiting function and avoiding damage to the crystal/PMT, solid reflector or optical interface as temperature within the detector changes. The support sleeve is radially compressible and expandable, preferably by means of a longitudinal slot in it.

According to an aspect of the invention, a scintillation detector includes a sleeve supporting a light sensing device against longitudinal and/or bending is loads.

More particularly, according to another aspect of the invention, a scintillation detector includes a hygroscopic scintillation crystal; a light sensing device, such as a PMT, optically coupled to the crystal; a resilient biasing device which loads the crystal and the light sensing device longitudinally; and a support sleeve circumscribing the crystal and the light sensing device which limits the longitudinal load on the light sensing device and/or associated electronics.

According to yet another aspect of the invention, a method of manufacturing a scintillation detector includes the steps of optically coupling a hygroscopic scintillation crystal to a photomuitiplier tube; forming an equipment assembly by inserting the crystal and the photomultiplier tube in a support sleeve which limits the longitudinal loading on the photomultiplier tube; inserting the equipment assembly in a housing; longitudinally loading the equipment assembly; and sealing the housing while maintaining a longitudinal load on the equipment assembly.

According to a further aspect of the invention, a scintillation detector includes means for optically coupling a hygroscopic scintillation crystal and a light sensing device; means for longitudinally loading the crystal and the light sensing device; and means for limiting the longitudinal load on the light sensing device.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

Figure 1:
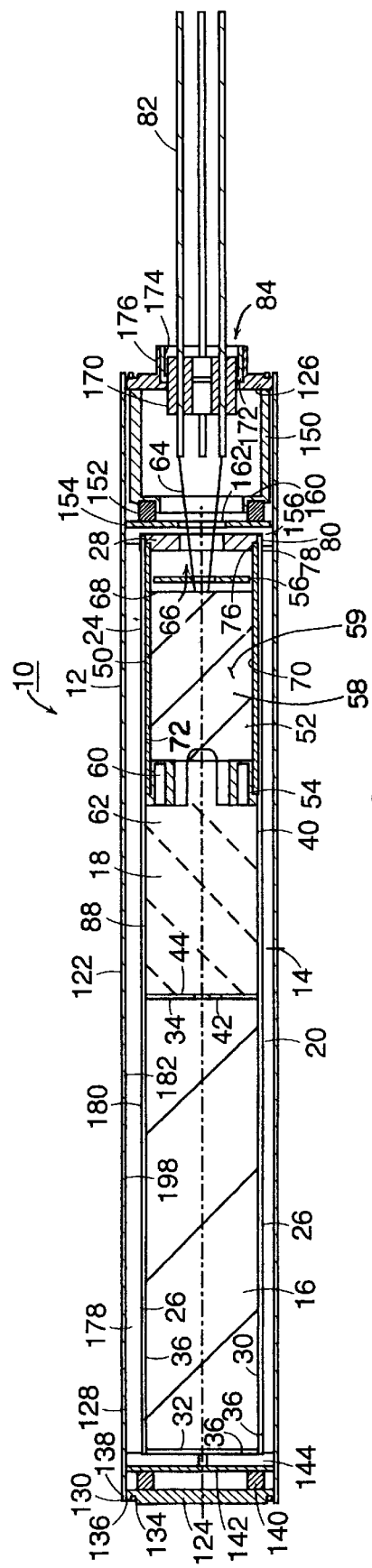
FIG 1 is a longitudinal sectional view of a scintillation detector according to the invention.

Referring now in detail to the drawings, FIG. 1 illustrates an exemplary and preferred scintillation detector 10 according to the present invention. The detector 10 comprises a housing 12 encapsulating an equipment assembly 14. The equipment assembly 14 includes a scintillation crystal 16 and a light sensing device such as a photomultiplier tube (PMT) 18, which are bonded together to form a crystal/PMT subassembly 20. The equipment assembly 14 also includes a voltage divider 24 electrically connected to the PMT 18. The crystal/PMT subassembly 20 and the voltage divider 24 are circumscribed by a support sleeve 26. The voltage divider 24 and the support sleeve 26 are engaged by and preferably attached to an end cap 28 which is also part of the equipment assembly 14. Details of the equipment assembly 14 are given below.

The illustrated scintillation crystal 16 has a cylindrical surface 30 and flat end faces 32 and 34, the surface finish of which may be sanded, polished, ground, etc., as desired. The crystal 16 may be, for example, thallium-activated sodium iodide crystal as in the illustrated embodiment. Alternatively, other crystal materials, such as a cesium iodide crystal, may be employed. The crystal 16 is surrounded at its radially outer surface 30 and axial end surface 32 by a layer 36 of reflecting material provided between the crystal and the support sleeve 26. The layer 36 of reflecting material preferably is formed by a white thin porous unsintered polytetrafluoroethylene (PTFE) sold under the trademark TETRATEC, PTFE sold under the trademark TEFLON, or the like. Being porous, air or gas can escape from between the layer 36 and the cylindrical surface 30 and the end 32 of the crystal 16 to avoid pockets of trapped air or gas. Such pockets are usually undesirable since trapped air or gas could have a negative impact on reflectivity at the layer-crystal interface. The porous PTFE film 36 is tightly wrapped around the crystal 16 and is generally self-adhering to the cylindrical surface 30 and the circular end 32 of the crystal 16.

It is desirable that the PMT 18 be a bare glass envelope phototube, in order to avoid introduction into the housing 12 of foreign materials generally associated with phototube assembly packaging that could off-gas during thermal cycling and thereby cause degradation in the crystal 16. An exemplary PMT 18 is phototube model number R1288-01, made by Hamamatsu Photonics K.K., of Hamamatsu City, Japan, suitably modified to remove foreign materials associated with phototube assembly packaging, as noted above. The PMT 18 has a layer 40 of 0.010 inch thick mu-metal foil wrapped around it to shield the PMT 18 from magnetic fields.

The crystal/PMT subassembly 20 is formed by connecting the crystal 16 and the PMT 18 using bonded optical interface 42. The end 34 of the crystal 16 and proximate end 44 of the PMT 18 are mechanically and optically bonded together by the interface 42. It is desirable for the material of the interface 42 to not degrade or out-gas during thermal cycling, and to have good optical properties, in that it allows scintillation light to pass-through unhindered. An exemplary material exhibiting such properties is SYLGARD® 186 encapsulating resin, a high strength room-temperature-curing silicone elastomer manufactured and sold by Dow Corning Corporation. This material maintains its effectiveness and minimizes out-gassing at temperatures up to 200° C. It also transmits the scintillation light well without excessive attenuation.

A further desirable property of the material of the interface 42 is that it allow some flexibility in the connection of the crystal 16 and the PMT 18, while still maintaining the crystal 16 and the PMT 18 mechanically coupled. Too much rigidity in the interface may make the PMT 18 and/or the interface 42 more vulnerable to breakage as the equipment assembly 14 is subjected to vibration and shock. Again, SYLGARD® 186 is a material that has this desirable property, although it is expected that other silicone materials and materials of other types will also possess acceptable properties.

It will be appreciated that the bonded optical interface may alternatively be a silicone gel pad which is cast or otherwise formed prior to adhering it to the crystal and the PMT by means of a liquid silicone, an optical grease, or the like.

The voltage divider 24 has a sleeve 50, preferably made of Teflon, which circumscribes an electronics package 52 located between a socket 54 and a disk 56. The electronics package 52 comprises electronics 58 and a potting material 59. The potting material, like all the materials of the voltage divider 24, is chosen to avoid out-gassing of materials that may degrade the crystal 16. A suitable potting material is SYLGARD 170 silicone-based potting compound.

The electronics of the electronics package 52 are connected at one end to socket 54, which is electrically connected with pins 60 at distal end 62 of the PMT 18. The socket 54 is designed to mate with the pins 60. The socket 54 may be an off-the-shelf item designed to mate with the PMT 18, for example a socket manufactured and sold by Hamamatsu Photonics to mate with its R1288-01 phototube.

At the opposite end of the electronics package 52 wires 64 pass-through the disk 56 and then out of the equipment assembly 14 through hole 66 in end cap 28. The wires are knotted between the electronics package 52 and the disk 56 for strain-relief purposes. The disk 56, which is preferably made of Teflon, is attached to the wires 64 by applying room temperature vulcanizing silicone adhesive between the disk 56 and the knot in the wires 64. Any strain on the wires 64 will not be transmitted to the connection between the wires 64 and the electronics in the electronics package 52.

The disk 56 may be close to surface 68 of the potting material 59. In an exemplary embodiment there is 0.125" between the end cap 28 and the surface 68.

The sleeve 50 has an inner circumferential surface 70 which mates with outer circumferential surface 72 of the socket 54. The socket 54 is attached to the sleeve 50 by applying a room temperature vulcanizing silicone adhesive on one or both of the circumferential surfaces 70 and 72, and pressing the socket 54 into the sleeve 50.

The end cap 28 has an annular recess 76 formed therein for receiving respective ends 78 and 80 of the sleeve 50 and the support sleeve 26. The ends 78 and 80 are adhered to the end cap 28 by use of a room temperature vulcanizing silicone adhesive.

The wires 64 are connected to leads 82 which pass out of the housing 12 through a hermetic conductor interface (pass-through) 84. The leads 82 are connected to power supplies and devices for recording and/or outputting a signal.

Although the detector has been described above with the voltage divider inside the housing, it will be appreciated that alternatively the voltage divide may be located external to the hermetically sealed housing, with wires or other electrical connections passing through the housing, such as by use of a multiple metal to ceramic pass-throughs.

The support sleeve 26 provides support for the crystal/PMT subassembly 20 when the equipment assembly 14 is longitudinally loaded. Without the presence of the support sleeve 26 or some means of limiting the longitudinal loading to the crystal/PMT subassembly 20, typical loading of the crystal/PMT subassembly 20 may cause damage to the PMT 18 under typical geophysical operating conditions. The support sleeve 26 allows adequate loading of the subassembly 20 in a longitudinal manner, while not directly pressuring outer cylindrical surface 88 of the PMT 18.

A potential additional problem is "hammering" of the PMT 18 by the crystal 16. With longitudinal shock loading, the crystal 16, which is relatively heavy, may act as a hammer as it is pushed against the PMT 18, which is relatively fragile. This "hammering" can cause breakage of the PMT 18. The support sleeve 26, and the boot 178 and the springs 140 and 152 described below, attenuate the loads on the crystal 16 and PMT 18 due to shock and/or vibration.

In order to optimally perform its function in limiting the longitudinal load on the crystal/PMT subassembly 20, it is desirable that the support sleeve 26 have a coefficient of thermal expansion similar to that of the crystal/PMT subassembly 20, particularly a coefficient of expansion substantially equal to that of the crystal 16. It is desirable that the difference in the coefficient of thermal expansion between the support sleeve 26 and the crystal 16 be no greater than $100 \times 10^{-6}$ inch/inch-° C., more preferably no greater than $50 \times 10^{-6}$ inch/inch-° C. and still more preferably no greater than $20 \times 10^{-6}$ inch/inch-° C. A suitable material for the support sleeve 26 is polyetheretherketone (PEEK). PEEK has a coefficient of thermal expansion of approximately $47 \times 10^{-6}$ inch/inch-° C., which is close to the coefficient of thermal expansion of a thallium-activated sodium iodide crystal, which has a coefficient of thermal expansion of $60 \times 10^{-6}$ inch/inch-° C.

Because a bare glass bulb PMT is relatively fragile, the crystal 16 of the present invention is subjected to less axial load than is typical of conventional MWD devices. An exemplary embodiment of the present invention utilizing a 1" diameter crystal is subjected to about a 100 lb longitudinal load. This is less than the 250 lb load which would be typical for prior detectors having such a crystal longitudinally loaded against an optical glass window. The use of a bonded optical interface between the crystal 16 and the PMT 18 allows the optical interface to be maintained even under this reduced axial load.

The support sleeve 26 also protects the bonded optical interface 42 by providing stiffness to the equipment assembly 14 against bending loads.

Figure 2:
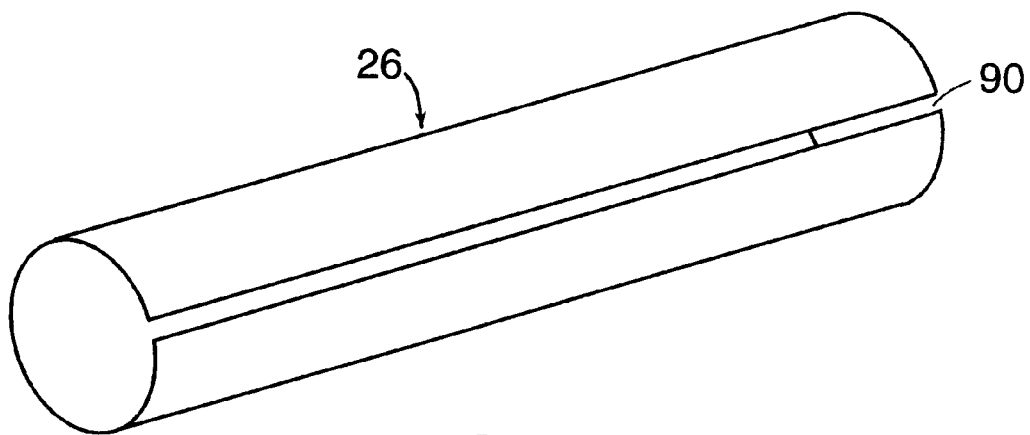
FIG. 2 is a perspective view of a support sleeve according to the present invention.

It is desirable for the support sleeve 26 to be radially compressible and expandable in order to insure a tight fit against the cylindrical surface 30 of the crystal 16, while maintaining ease of installation of the support sleeve 26. Having a tight fit of the support sleeve 26 against the crystal 16 keeps the reflecting layer 36 pressed against the crystal 16, which assures good performance of the reflecting layer 36. It is also desirable for the support sleeve 26 to be radially expandable and contractible to accommodate expansions and contractions of the crystal due to temperature changes. In a preferred embodiment, the support sleeve 26 is slotted along its longitudinal length, thereby providing a longitudinally extending gap 90. In a exemplary embodiment, for a 1" outer diameter crystal, the support sleeve is 8" long, has a 1.1" outside diameter, is 0.020" thick, and has a 0.060" wide gap. The tolerance for the thickness in the exemplary embodiment is ±0.003". The thickness is selected to provide sufficient compression strength against the longitudinal loads to which the support sleeve is subjected during use, while also affording sufficient resistance to bending loads that might cause separation of the optical interface or damage to the crystal or PMT. A visual example of the support sleeve 26 with the gap 90 is illustrated in FIG. 2.

It will be appreciated that other materials, for example polyamide resins sold by Dupont under the trademark VESPEL, or other thermoplastic materials, may be substituted PEEK.

The housing 12 includes a tubular metal casing 122 which preferably is cylindrical like the crystal 16 as in the present case. Casing 122 is closed at its rear end by a back cap 124 and at its front end by a shield cap 126 and the conductor interface 84. The casing 122 and the back cap 124 preferably are made of stainless steel, as is conventional. The back cap 124 is joined to the rear end of the casing 122 by a vacuum type peripheral weld, such as a tungsten inert gas weld. As seen at the left in FIG. 1, cylindrical wall 128 of the casing 122 is interiorly recessed to form a welding flange 130 which defines a close fitting pocket for receipt of the back cap 124. The back cap 124 has, opening to its outer side, an annular groove 134 spaced slightly inwardly from its circumferential edge to form a thin annular welding flange 136 and a reduced narrow thickness connecting web 138. Welding is effected at the outer ends of the juxtaposed thin welding flanges 130 and 136, and the reduced thickness of the connecting web 138 further reduces welding heat conduction away from the welding flanges 130 and 136 to permit formation of a desired hermetic weld.

The back cap 124 and the equipment assembly 14 have sandwiched therebetween, going from left to right in FIG. 1, a resilient biasing device such as a spring 140, a thrust plate 142, and a cushion pad 144. The spring 140, or other resilient biasing device, functions to axially (longitudinally) load the equipment assembly 14 and hold it in place. The spring 140 may be a stack of wave springs disposed crest to crest, or may alternatively include resilient biasing devices such as coil springs, resilient pads, and the like.

The thrust plate 142 functions to spread the spring force across the transverse area of the cushion pad 144 for substantially uniform application of pressure and axial loading to the equipment assembly 14. The cushion pad 144 is made of a resilient material and preferably a silicone rubber (elastomer) to which a reflecting material such as aluminum oxide powder may be added.

The equipment assembly 14 is also axially loaded from the opposite end of the housing 12. Referring to the right hand side of FIG. 1, the shield cap 126 is attached to the casing 122 by welding, in a manner similar to the welding of the back cap 124 to the casing 122. Between the shield cap 126 and the end cap 28 are, from right to left, a tubular spring mount 150, a resilient biasing device such as a spring 152, a thrust plate 154, and a cushion pad 156.

The spring mount 150 is preferably made of stainless steel or aluminum, and may include a stepped mounting flange 160 upon which the spring 152 is mounted. The spring 152 may be wave springs, or may alternatively include other types of resilient biasing devices, for example a coil spring, or other resilient devices/materials.

The thrust plate 154 functions to spread the spring force of the spring 152 across the transverse area of the cushion pad 156 for substantially uniform application of pressure and axial loading to the equipment assembly 14. The cushion pad 156 may be made of a similar resilient material to that of the cushion pad 144. The spacer plate 154 has a hole 162 therein to allow passage of the wires 64 therethrough.

The conductor interface 84 includes a ceramic insulator 170 through which brazed leads 82 pass, and a metal ring 172, preferably made of stainless steel, which is brazed to the ceramic insulator 170. The metal ring 172 has a welding flange 174 which mates with welding flange 176 of the shield cap 126. When so mated the welding flanges 174 and 176 are welded together, hermetically sealing the conductor interface 84 to the shield cap 126.

The equipment assembly 14 is surrounded by a shock absorbing boot 178 which also functions to accommodate radial expansion at the crystal 16 and support sleeve 26. The boot 178 preferably extends the length of the support sleeve and preferably grips the support sleeve 26 to aid in holding the support sleeve 26 tightly against the crystal/PMT subassembly 20. As shown, the boot 178 is preferably cylindrical and concentric with both the crystal/PMT assembly 20 and the casing 122. The boot 178 is made of resiliently compressible material and preferably is a silicone rubber, elastomer, or silicone elastomer, the latter preferably being a fast setting silicone elastomer. Preferably, the silicone elastomer does not include any fillers such as $Al_2O_3$ powder that may degrade performance. Alternatively, the shock absorbing boot 178 may comprise any member that provides a shock absorbing function about the circumference and length of the equipment assembly 14. The boot 178 may have a smooth inner surface 180 and outer surface 182, or may have ribs extending axially or circumferentially on either the inner surface 180 or the outer surface 182. In other alternative embodiments, the shock absorbing member 178 may have dimples or geometrically shaped protrusions on either the inner surface 180, the outer surface 182, or both.

As is preferred, the casing 122 and the boot 178 have interposed therebetween a boot sleeve 198 which extends longitudinally from the back cap 124 to the cushion pad 156. The sleeve 198, when circumscribing the boot 178 and the equipment assembly 14 in a substantially uncompressed state, has an outside diameter that exceeds the inside diameter of the tubular metal casing 122. Therefore, to insert the sleeve 198 into the casing 122, the sleeve 198 must be compressed, thereby causing the boot 178, made of resilient material, to radially compress the equipment assembly 14, which in turn radially loads the equipment assembly 14. Preferably the sleeve 198 is metal, for example, stainless steel. Alternatively, however, the sleeve 198 may be composed of any material which has a lower coefficient of friction with the casing 122 than does the boot 178 with the casing 122.

Figure 3:
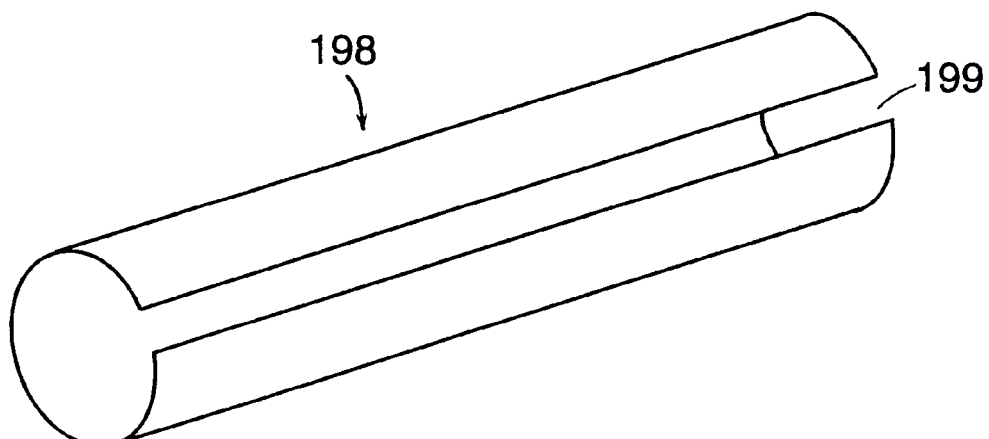
FIG. 3 is a perspective view of a boot sleeve which may be used in the exemplary embodiment.

The boot sleeve 198 should be radially compressible to effectuate substantial radial compression of the boot 178 against the equipment assembly 14. In a preferred embodiment, the sleeve 198 is slotted along its longitudinal length, thereby providing a longitudinally extending gap 199. The longitudinally extending gap 199 may vary between a substantial width, when the boot 178 resides within the sleeve 198 without any externally applied compression, and almost no appreciable width, when the sleeve 198 and the boot 178 are under a substantial radial compressive force when inserting the sleeve 198 and boot 178 into the casing 122. Under such compressive forces the longitudinal edges of the slotted sleeve 198 approach and may come into physical contact with one another causing the outside diameter of the sleeve 198 to be reduced. A visual example of the slotted sleeve 198 and the gap 199 is illustrated in FIG. 3.

The boot sleeve 198 provides for uniform and controlled radial loading of the equipment assembly 14, and especially of the crystal 16. The thickness of the boot sleeve 198 along its axial length may be controlled with tight tolerances, thereby providing for uniform radial loading along the crystal's entire length. To increase or decrease the amount of radial loading, the thickness of the boot sleeve 198 may be varied, wherein a thicker sleeve increases the radial loading on the equipment assembly 14 and vice-versa. Since the thickness of the boot sleeve 198 may be tightly controlled, so too can the radial loading on the equipment assembly 14, and thus the stiffness of the crystal 16 which forms a part of the equipment assembly 14.

The boot sleeve 198 also facilitates assembly of a subassembly including the equipment assembly 14 and the boot 178, into the casing 122. During insertion of the subassembly into the casing 122, the boot sleeve 198 provides a coefficient of friction between the boot sleeve 198 and the metal casing 122 which is substantially less than the coefficient of friction between the boot 178 and the casing 122.

Figure 4:
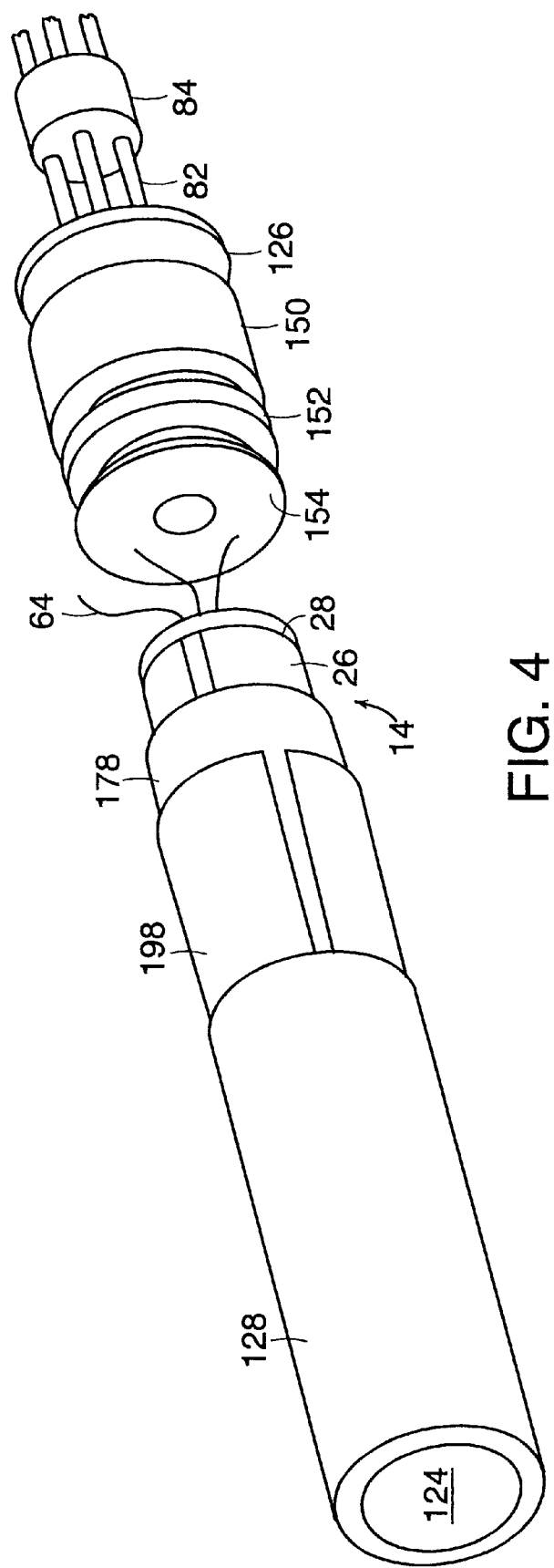
FIG. 4 is an exploded perspective diagram illustrating assembly of the components of the present invention.

FIG. 4 is an exploded perspective view illustrating a manner in which the detector 10 may be assembled. Initially the parts are cleaned, cycled thermally, and dried. After appropriately wrapping the crystal 16 with the reflecting layer 36, and wrapping the PMT 18 with the foil 40, the crystal/PMT subassembly 20 is formed by bonding the scintillation crystal 16 and the PMT 18 by means of the bonded optical interface 42, as described above. The voltage divider 24 is then coupled to the PMT 18, and the crystal/PMT subassembly 20 and the voltage divider 24 are inserted into the support sleeve 26, the support sleeve being radially expanded to facilitate insertion. The voltage divider 24 and the support sleeve 26 are attached to the end cap 28 with the wires 64 protruding out the hole 66. The support sleeve 26 is then installed over the crystal/PMT subassembly 20, and the voltage divider 24, with both the support sleeve 26 and the sleeve 50 of the voltage divider being attached to the end cap 28.

The equipment assembly is then inserted into the boot 178. Oxide powder may be used to dust the inside of the boot 178 to facilitate insertion of the equipment assembly. The boot 178 is then inserted in the sleeve 198 to form a equipment-boot-sleeve subassembly. The casing 122 is prepared for insertion of the subassembly by welding the back cap on to the cylindrical wall, and inserting the spring 140, the thrust plate 142, and the cushion pad 144 into the housing 12. At this point, the outside diameter of the boot sleeve 198, with the boot 178 in an uncompressed state, will be greater than the inside diameter of the metal casing 122. Therefore, to insert the boot sleeve 198 into the casing 122, a radial compression force is applied to the boot sleeve 198 at an end first to be inserted into the casing 122 to compress the boot sleeve 198 sufficiently to enable insertion of the subassembly into the casing 122.

After the equipment assembly 14, boot 178, and boot sleeve 198 are inserted into the metal casing 122, the silicone pad 156, the thrust plate 154, and the spring 152, are inserted into the metal casing 122. Thereafter the spring mount 150 and the shield cap 126 are inserted against spring pressure and the shield cap 126 is welded to the metal casing 122, with the wires 64 protruding from the housing 12 through the space where the conductor interface 84 will be inserted. The wires 64 are then connected to the inner ends of the leads 82, and the conductor interface 84 is mated with the shield cap 126, the shield cap 126 then being welded to the body 172 of the conductor interface 84 to complete the assembly process.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

What is claimed is:

1. A scintillation detector comprising:
   a scintillation crystal;
   a light sensing device optically coupled to the crystal;
   a housing enclosing the crystal and light sensing device, the housing having a tubular wall surrounding the crystal and light sensing device;
   a support sleeve circumscribing and supporting the crystal and light sensing device;
   a resilient biasing device which longitudinally loads the support sleeve; and
   a resilient shock-absorbing boot interposed between the support sleeve and the tubular wall of the housing.

2. The detector of claim 1, wherein the light sensing device is a photomultiplier tube.

3. The detector of claim 1, wherein the housing is hermetically sealed around the crystal, the light sensing device, and the support sleeve.

4. The detector of claim 3, wherein the light sensing device is a photomultiplier tube.

5. The detector of claim 4, further comprising a voltage divider electrically connected to the photomultiplier tube, and the support sleeve also circumscribes the voltage divider.

6. The detector of claim 1, wherein the resilient biasing device includes a spring interposed between an end of the support sleeve and an end wall of the housing.

7. The detector of claim 1, wherein the resilient biasing device includes a pair of springs at opposite ends of the support sleeve.

8. The detector of claim 1, wherein the crystal and the support sleeve have similar coefficients of thermal expansion.

9. The detector of claim 8, wherein the difference in the coefficients of thermal expansion of the crystal and the support sleeve is no greater than 100×10−6 inch/inch-° C.

10. The detector of claim 9, wherein the difference in the coefficients of thermal expansion of the crystal and the support sleeve is no greater than 60×10−6 inch/inch-° C.

11. The detector of claim 1, wherein the crystal is made of thallium-activated sodium iodide.

12. The detector of claim 11, wherein the support sleeve is made of polyetheretherketone.

13. The detector of claim 1, wherein the crystal and the light sensing device are mechanically bonded together.

14. The detector of claim 13, wherein the mechanical and optical bonding of the crystal and the light sensing device is effected by use of a silicone bonding material.

15. The detector of claim 1, further comprising a reflector interposed between the crystal and the support sleeve, wherein the reflector surrounds the crystal.

16. The detector of claim 15, wherein the support sleeve has a longitudinally extending gap.

17. A method of manufacturing a scintillation detector comprising the steps of:
   optically coupling a scintillation crystal to a photomultiplier tube;
   forming an equipment assembly by surrounding the crystal and the photomultiplier tube with a support sleeve;
   inserting a resilient shock absorbing boot around the equipment assembly;
   inserting the equipment assembly and boot in a housing; and
   longitudinally loading the equipment assembly.

18. A method of claim 17, further comprising the step of hermetically sealing the housing.

19. The method of claim 17, wherein the step of optically coupling comprises optically and mechanically coupling the crystal and the photomultiplier tube.

20. The method of claim 19, wherein the optically and mechanically coupling includes placing an encapsulating resin between the crystal and the photomultiplier tube.

21. The method of claim 17, wherein the loading includes loading the equipment assembly on opposite ends by springs pressing on each of the ends.

22. The method of claim 17, wherein the forming step includes radially expanding the support sleeve to facilitate placement of the crystal and the photomultiplier tube therewithin.

23. A scintillation detector comprising:
   means for optically coupling a hygroscopic scintillation crystal and a light sensing device;
   means for longitudinally pre-loading the crystal and the light sensing device; and
   means for limiting the longitudinal pre-load applied by the means for longitudinally pre-loading on the crystal and the light sensing device.

24. The detector of claim 23, wherein the light sensing device is a photomultiplier tube.

25. The detector of claim 24, wherein the means for limiting is a support sleeve.

26. A scintillation detector comprising:
   a hygroscopic scintillation crystal;
   a light sensing device optically coupled to the crystal;
   a resilient biasing device which pre-loads the crystal and the light sensing device longitudinally; and
   a support sleeve circumscribing the crystal and the light sensing device which limits the longitudinal pre-load applied by the resilient biasing device on the crystal and the light sensing device.

27. A method of manufacturing a scintillation detector comprising the steps of:
   optically coupling a hygroscopic scintillation crystal to a photomultiplier tube;
   forming an equipment assembly by inserting the crystal and the photomultiplier tube in a support sleeve which limits longitudinal pre-loading on the crystal and the photomultiplier tube;
   inserting the equipment assembly in a housing;

longitudinally pre-loading the equipment assembly by engaging an end of equipment assembly with a resilient biasing device inserted in the housing; and sealing the housing while maintaining the longitudinal pre-load on the equipment assembly, with the support sleeve positioned to limit longitudinal movement of the resilient biasing device thereby to limit the longitudinal pre-load applied to the crystal and photomultiplier tube.

* * * * *